Nov. 28, 1939.                E. REANEY                  2,181,151
ADJUSTABLE SHANKLESS BIT AND HOLDER THEREFOR
Original Filed July 27, 1933
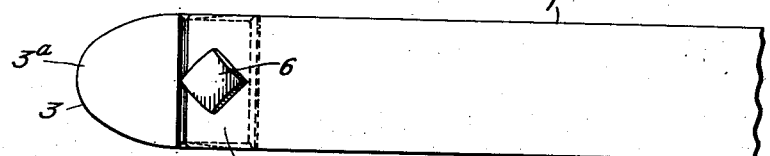
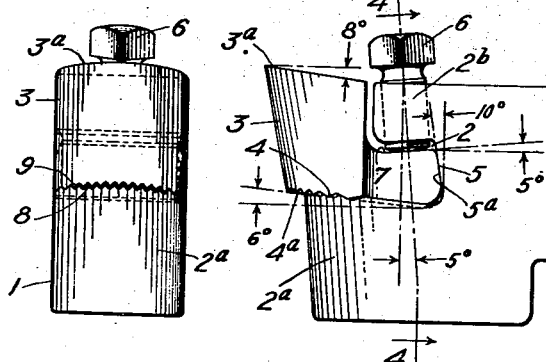
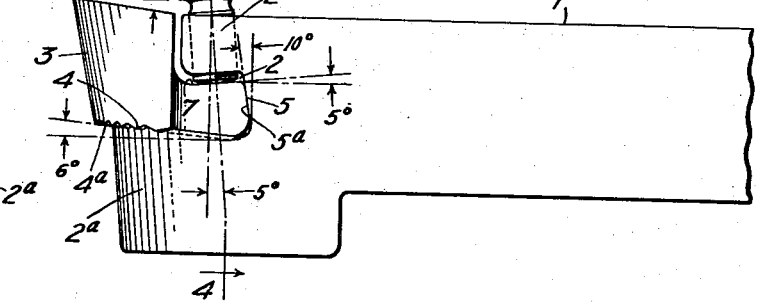
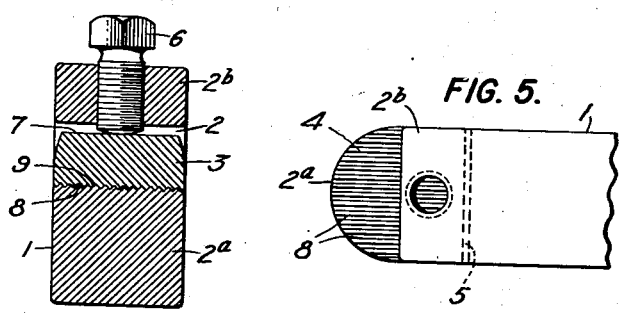
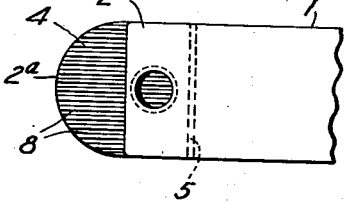
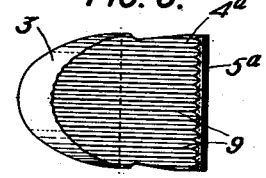
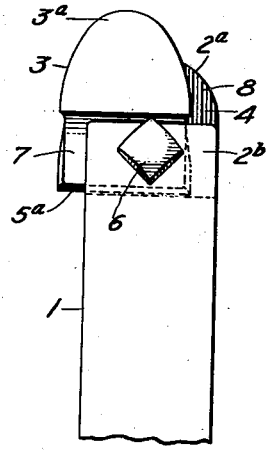
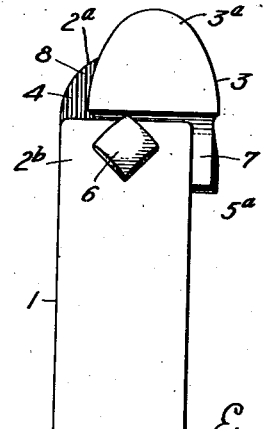
INVENTOR
Ernest Reaney
BY
Nathan, Bowman + Helferich
ATTORNEYS Patented Nov. 28, 1939

2,181,151

UNITED STATES PATENT OFFICE 2,181,151

ADJUSTABLE SHANKLESS BIT AND HOLDER THEREFOR

Ernest Reaney, Bridgeport, Conn., assignor to The O. K. Tool Company, Inc., New York, N. Y., a corporation of New York Application July 27, 1933, Serial No. 682,389
Renewed March 27, 1935

5 Claims. (Cl. 29—96)

The present invention relates to high speed steel insertable bits and holders therefor particularly adaptable for performing the heaviest of metal cutting operations in machine tools, such as planers, shapers and lathes, and is an improvement upon the type of tool bit and holder disclosed in an application filed by me on November 19, 1931, Serial No. 576,081, of which this is a continuation in part.

For machining the heavier classes of work, such as car wheels, drums and other large workpieces, an efficient cutting tool bit must be capable of repeated resharpenings and of bearing enormous cutting pressures to a red heat without breaking down or displaying any tendency to loosen itself from its holder, and although an infinite number of inserted bit tools have heretofore been designed, not one of them, insofar as I am aware, satisfactorily meets the requirements of strength, rigidity and adjustability so essential in the heavy machining operations the tool is required to perform.

A primary aim of the invention is to provide an unusually strong and rigid insertable tool of few parts which may be inexpensively manufactured and assembled and of a design such that the component of pressures resulting from the cutting operation tend to drive the bit more firmly into its socket in the holder.

The invention further aims to provide a high speed steel cutting bit of strong rugged character capable of taking extremely heavy cuts of metal without danger of fracture and a bit which may be repeatedly reground and resharpened, to provide a succession of new cutting edges, without interfering with the shape, size, or position of that portion of the bit by which it is seated and retained in its socket in the holder, nor with the functioning and action of the bit clamping means itself.

In the performance of the heavy cutting operations above mentioned, the cutting tools are subjected to enormous end and lateral pressures and unless the bit and bit socket are so designed as to take advantage of these stresses, looseness and chattering of the bit in the holder soon follows. What I aim to do is to utilize and take advantage of these forces in perfecting a more secure and rigid bit mounting.

In my prior application, above referred to, there is disclosed a holder member provided at its forward end with a transversely arranged bit socket within which a high speed steel or analogous alloy cutting tool bit is adapted to seat. The lower wall of the bit socket projects further forward than the upper wall and provides a relatively flat support of large area upon which the entire base of the bit seats. This flat supporting base extends rearwardly of the holder and is downwardly inclined, terminating in a forwardly inclined abutment wall, the two walls together forming an acute angle at the rear of the bit socket.

To give a marked degree of strength and durability to the cutting bit, the bit itself, as shown in my prior application, is substantially L-shaped, the upstanding extremity thereof providing the cutting edge and ample material for repeatedly regrinding thereby to provide a succession of new cutting edges. The lower extremity of the bit provides a wide base portion affording large flat seating and clamping surfaces at angles coincident with those of the bit socket. With this construction, it is to be observed, the normal tendency of the tooling forces to which the bit is subjected is to move the bit downwardly and rearwardly into its wedge-shaped socket. In addition to this self-seating feature, a clamp screw is provided which is adapted to engage the top surface of the bit and move the same downwardly and rearwardly in its socket and to maintain the bit in that position.

My improved form of bit and bit lock is particularly designed so that the component of the downward end thrusts on the tool bit are distributed over large areas and transmitted directly to the holder body, the overhanging rear inclined wall, assisted by the action of the clamp screw, effectively preventing any tendency of the rear portion of the bit to lift or chatter in its socket. To prevent movement of the bit laterally in its socket under the action of the lateral cutting forces, I do not rely upon friction alone which is characteristic of many of the prior devices, but I have also provided means whereby the bit is interlocked with the holder in a manner not interfering with the self-seating features of the bit or the ease with which it may be removed or replaced, but in a manner such that the bit is positively prevented from creeping laterally under the action of the lateral stresses thereon.

In the attainment of these ends, I have, in my prior application, provided the lower surface of the bit with a longitudinally extending rib which is adapted to project into a slot in the lower wall of the socket for the purpose of preventing any lateral creep of the bit under the lateral pressure to which it is subjected by the cutting forces.

By thus positively interlocking the bit with the holder, although it accomplishes its purpose of preventing lateral creep of the bit, a tool so designed is not adaptable for performing cutting operations close to a shoulder or a flange, etc. upon the workpiece undergoing machining, because of interference with the shank or body portion of the holder.

I have now conceived of a construction having all of the features and advantages set forth above with the additional feature of provision of means whereby a shankless tool bit may also be adjusted laterally of the holder to accommodate the tool for cutting close to the headstock or chuck of the lathe or to shoulders, flanges, etc. formed or occurring on the workpiece.

With that end in view I have formed the bottom surfaces of the bit and socket with a series of parallel serrations, extending preferably in the direction of the length of the holder, which are adapted to interfit with each other thereby to lock the bit positively against lateral creep while at the same time affording a ready means whereby the tool may be offset from the holder one or more serrations and the assembled tool thus accommodated for tooling in restricted areas such as those above mentioned.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which:

Figs. 1, 2 and 3 are respectively side, front and plan views of a representative type of tool incorporating the present invention. Fig. 4 is a transverse sectional view through line 4—4 of Fig. 1. Fig. 5 is a plan view of a portion of the holder with the bit and clamp screw removed. Fig. 6 is a bottom view of the bit illustrating more clearly its large flat seating area and the serrations affording the means of lateral readjustment. Figs. 7 and 8 are views illustrating the bit offset from the holder thereby providing right and left hand tools respectively.

Referring more particularly to Fig. 1 of the drawing, the invention is disclosed as embodied in a cutting tool comprising an elongated holder member 1 provided with a socket 2 at its forward end adapted to receive a detachable cutting bit 3.

A rigid lock or clamping of the bit is obtained by forming the socket 2 substantially dove-tailed, the lower section 2ª of the holder member bounding the socket projecting a substantial distance beyond the upper section 2ᵇ of the holder. This lower section 2ª of the holder is provided with a bit engaging surface 4, which surface, as illustrated in Fig. 1, is inclined downwardly from the horizontal from front to rear of the holder, preferably at an angle of about 6°, and extends across the full width thereof thereby providing an inclined area of relatively large dimensions upon which the bit 3 rests.

The inner end wall 5 of the socket 2 is inclined forwardly from the vertical approximately 10° thereby forming an acute angle between the bit engaging surfaces 4 and 5. These two surfaces of contact are arranged substantially opposite the cutting portion 3ª of the bit so that the resultant of the cutting forces upon the bit tends to wedge the latter into said acute angle and maintain it more firmly in the holder member 1. In addition to this self-seating characteristic there is provided a set screw 6 carried by the overhanging portion 2ᵇ and inclined downwardly and rearwardly and which is adapted to engage the upper surface of the tool bit, at a point well toward the rear thereof, for the purpose of holding the bit firmly against the surfaces 4 and 5 of the holder. The surface 4, being inclined as above explained, the resultant of the action of the screw 6 is also to move the bit 3 rearwardly and into engagement with the back wall 5 of the bit aperture. Movement of the bit into clamped position is further facilitated by inclining the axis of the screw 6, say 5°, so that its axial movement is also in the general direction of the apex of the angle formed by the two areas 4 and 5.

The tool bit 3 is preferably L-shaped and of a width substantially equal to the width of the holder in order to provide large seating and cutting areas. The forward and top surfaces of the upstanding portion of the bit are formed with the usual clearance and rake angles as is customary with tools of this character, while the lower extremity of the bit is provided with bottom and rear faces 4ª and 5ª disposed at angles corresponding to those of the socket thereby forming two large areas for contact with the surfaces 4 and 5.

The upper surface 7 of the rearwardly projecting portion tool bit 3 is preferably parallel to the bottom surface but inclined upwardly approximately 5° from front to rear, and which, together with its inclined bottom surface 4ª, forms, in effect, the tenon portion of a dove-tailed joint, the widest portion thereof being at the rear end and smaller in width than the "throat" portion of the dove-tailed opening 2 formed in the holder. The screw 6, it will be seen, overhangs the "tenon" on the bit and which, together with the inclined wall 4 of the holder, forms the other portion of the dove-tailed joint, thus providing a blade lock of a character such that the blade cannot move endwise, forwardly or rearwardly, when clamped in its socket in the holder.

It is to be noted also that substantially the entire under surface 4ª of the bit 3 is engaged by the entire surface 4 provided by the holder whereby the bit has a firm undersupport throughout its length and the pressure of the tooling forces distributed over a relatively large area. Since the undersupport for the bit projects well forward, overturning of the bit because of the forces acting on the nose thereof is thereby reduced to a minimum and further prevented by reason of the effective action of the set screw 6 and the overhang of the inclined rear wall 5. After the tool has been in use for a while the cutting edges 3ª become worn. This preferred form of bit is, therefore, designed to be repeatedly resharpened by removing a thin layer from the top surface. It is to be noted that a great many "layers" may be removed and a succession of new cutting edges provided before the bit is weakened or rendered unfit for service, and with this type of bit and lock the resharpening operation is greatly expedited because the holder member need not be unclamped or removed from the post or bed of the machine.

The cutter bit disclosed in my prior application was provided with a rib and slot connection with the holder and which maintained the center line of the bit substantially coincident with the center line of the shank and effectively prevented any lateral creep under load. And while this type of construction is satisfactory for certain uses, a tool so constructed cannot be used for such operations wherein it is desired that the cut be taken close to a projecting surface or abutment for the reason that frequently the holder or post strikes the projection before the cut is finished.

The present invention is an improvement upon the structure disclosed in my prior application in that I have now provided a construction whereby the tool bit may be "off-set" laterally from the holder whenever necessary, and at the same time retaining all of the interlocking features and principles of the prior construction. How this new result is accomplished is illustrated most clearly in Figs. 5 and 6 of the drawing in which it will be seen, a series of parallel serrations 8, extending preferably in the general direction of the length of the holder, are formed upon the surface 4 of the socket. Likewise, a series of parallel serrations 9 are formed upon the adjacent surface 4ᵃ of the tool bit, and when the parts are assembled the two series of serrations interfit with each other and provide means whereby the bit is not only positively locked against lateral creep but may readily be readjusted laterally of the holder the requisite amount to the right or to the left. Since the rear abutment surfaces of the bit and socket are substantially perpendicular to the longitudinal axis of the holder, lateral adjustments of the bit to form what is known as a left or right hand offset cutter, do not, it will be seen, alter the endwise position of the bit with respect to the workpiece. Figs. 7 and 8 of the drawing illustrate tool holders having the bits adjusted so as to form left and right hand offset tools. Readjustment of the bit to compensate for wear and regrinding is likewise adapted to be effected in this manner.

A further characteristic feature of this type of tool is that the dove-tailed opening in the holder is made larger than the dove-tail formed upon the bit whereby it is possible not only to insert the widest portion of the bit through the narrowest portion of the socket, that is move the bit endwise of its socket in inserting or removing same, but to slightly raise the bit and disengage the serrations so that the bit may be stepped-over laterally to a new position without removing the bit from the holder. Under certain conditions of machining operations where there is but little or no room for endwise movement of the bit, lateral readjustments thereof may be effected in this economical manner without upsetting the position of tool holder in the tool post.

In addition to adjustment features above referred to the serrations 8 and 9, it will be seen, act as guide means facilitating the self-seating of the tool bit and perform the further function of positively locking the bit against lateral movement while under load and of preventing any tendency of a left or right hand cutter to "pivot" while under load.

From the foregoing it will be perceived that an insertable bit cutting tool is provided of very few parts and which, due to the relation and arrangement of surfaces defining the bit seat, the forces incident to tooling operations are transmitted directly to the body of the holder and tend not only more firmly to seat the bit but to relieve the bit clamping means of such stresses, and by placing serrations upon at least two adjacent faces of the bit and holder, the bit is locked positively in adjusted position while nevertheless permitting ready and easy adjustment thereof in a lateral direction, quickly converting a "straight" holder and bit to one of the left or right "offset" type.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A cutting tool combining a holder member provided at its forward end with a transversely arranged bit socket, the axis of said socket being horizontal; a high speed steel cutter bit provided with a rearwardly extending dove-tailed foot portion adapted to seat in said socket; said cutter being substantially L-shaped, the upstanding portion affording the cutting edge and ample material for providing a succession of new cutting edges; screw means the axis of which forms an acute angle with the lower surface of said dove-tailed foot portion and bit socket carried by the upper projecting portion of the holder defining the socket adapted to engage said rearwardly extending foot portion of the bit and move and maintain the latter firmly against the bottom and rear walls of the socket, the rear and end walls of the socket and foot portion respectively being forwardly inclined at an acute angle with respect to the bottom wall whereby the reactionary cutting forces acting upon the upstanding portion of the bit, in addition to the action of said screw means, normally tends to wedge said bit firmly in its socket; and a series of interfitting serrations formed upon the adjacent bottom surfaces of said bit and opening for positively locking said bit against lateral movement relative to the holder and affording means whereby said bit may be laterally adjusted in its socket for the purpose of performing either left or right handed tooling operations.

2. An insertable bit cutting tool combining a holder member having a socket therein adapted to receive a cutter bit, said socket extending inwardly from a surface of the holder and having a downwardly inclined bottom wall and a forwardly inclined rear wall; a metal cutter bit insertable in said socket, said bit being substantially L-shaped, the upstanding portion of which provides a cutting edge and ample material for repeatedly providing a succession of new cutting edges, the other portion of said bit forming a base with a rearwardly extending portion having diverging top and bottom surfaces which terminate in a forwardly inclined end wall coincident with the inclined walls of said socket; clamp means carried by said holder adapted directly to engage the base portion of said bit rearwardly of said upstanding portion to move said bit downwardly and rearwardly into firm engagement with said bottom and rear walls of said socket said clamp means including a screw the axis of which is forwardly inclined at an acute angle with the lower walls of said base and socket and adapted directly to engage the upper surface of said base portion forward of the inclined rear wall thereof; and means comprising a series of interfitting parallel serrations between adjacent faces of said bit and holder by which said bit may be adjusted laterally in said socket to a normal cutting position at either side of the longitudinal axis of the holder and positively maintained in a laterally adjusted position in spite of its tendency to creep under the pressure of the lateral forces to which it is subjected, the top wall of said socket being spaced from the top wall of the rearwardly extending portion of the bit a distance sufficient to permit lateral adjustments of said bit without removing same from the socket.

3. A heavy duty metal cutting tool comprising a rigid one-piece shank having a bifurcated forward end affording a bit-supporting portion provided with a bit-receiving seat extending inwardly and downwardly from the front end of said shank, a portion spaced from and overlying said bit-supporting portion, and an abutment wall connecting said portions, said abutment wall extending upwardly and forwardly from said bit-receiving seat and connecting with said overlying portion; a cutter bit of high grade metal having a foot portion engaging said seat, said foot portion being substantially rectangular in cross section but tapered in the direction of its length, the wider portion thereof being innermost and engaging said abutment wall; a tongue and groove connection between said foot portion and said bit-supporting portion, said tongue and groove connection extending in the direction of the length of said shank to permit said bit to be moved lengthwise of said shank; and a clamp screw threaded downwardly and inwardly through said overlying portion and engaging the upper surface of said foot portion to force said bit downwardly against said seat and inwardly against said abutment wall.

4. A heavy duty metal cutting tool comprising a shank provided at its forward end with a bit-receiving aperture defined by a seat inclined to the axis of said shank, a forwardly inclined abutment surface located rearwardly of and at an acute angle to said seat and an overlying top section formed integral with said shank; a substantially L-shaped cutter-bit of high grade metal fitted within said aperture one extremity of said bit affording a cutting portion and material for a succession of regrindings and the other portion constituting a foot, said foot portion having its bottom wall in engagement with said seat and an end wall in engagement with said abutment surface, the upper surface of said foot portion being longitudinally inclined at an acute angle with the under surface whereby the foot portion is rectangular in cross-section and tapered in the direction of the length of said shank with the larger portion remote from said cutting portion and adjacent said abutment surface; a tongue and groove connection between the foot portion of said bit and said seat to prevent relative lateral movement between the bit and the shank but to permit relative lengthwise movement therebetween, the overlying section of said shank being spaced from the top surface of said foot portion a distance sufficient to permit the widest portion of the bit to pass therethrough in a longitudinal direction; and clamp means engaging the upper surface of said foot portion and said overlying portion and acting in a downward and rearward direction to force said cutter bit downwardly against said seat and simultaneously rearwardly against said abutment wall.

5. A heavy duty metal cutting tool comprising a one-piece shank provided at its forward end with a bit-receiving aperture defined by a rearwardly and downwardly inclined blade seat, a forwardly inclined abutment surface located at the rear of and at an acute angle to said seat and an overlying integral top section; a substantially L-shaped cutter-bit of high grade metal fitted within said aperture one extremity of said bit affording a cutting portion and the other portion constituting a foot, said foot portion having its bottom wall in engagement with said seat and an end wall in engagement with said abutment surface, the upper surface of said foot portion forming an acute angle with the under surface whereby the foot portion is substantially dovetailed in the direction of the length of said shank with the larger portion remote from said cutting portion and adjacent said abutment surface; a tongue and groove connection between the foot portion of said bit and said seat to prevent relative lateral movement between the bit and the shank but to permit relative lengthwise movement therebetween; and clamp means comprising a clamp screw forwardly inclined at an acute angle with respect to said bottom surface threaded through said overlying section of the shank and adapted to directly engage said foot portion to force said cutter bit downwardly against said bottom seat and simultaneously rearwardly against said abutment surface.

ERNEST REANEY.